July 29, 1941.     C. M. HINES     2,251,132
BRAKE CONTROL MEANS
Filed April 26, 1940
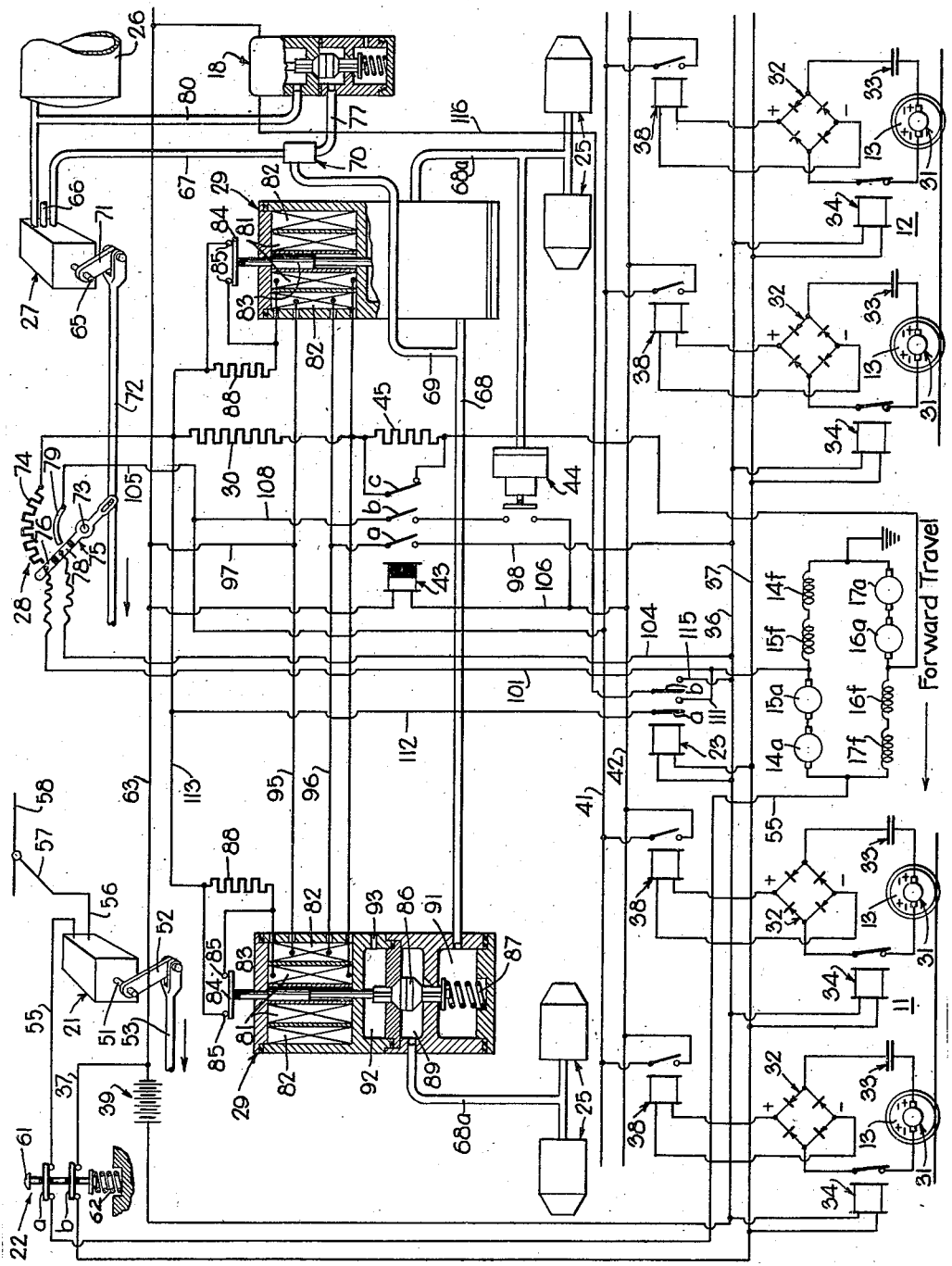
INVENTOR
CLAUDE M. HINES
BY 
ATTORNEY Patented July 29, 1941

2,251,132

UNITED STATES PATENT OFFICE 2,251,132

BRAKE CONTROL MEANS

Claude M. Hines, Pittsburgh, Pa., assignor to The Westinghouse Air Brake Company, Wilmerding, Pa., a corporation of Pennsylvania Application April 26, 1940, Serial No. 331,739

21 Claims. (Cl. 303—3)

This invention relates to brake control means for vehicles, such as railway cars or trains, and has particular relation to brake control apparatus automatically effective to rapidly reduce the degree of application of the brakes associated with individual wheel units, when any of the wheel units begins to slip due to excessive application of the brakes, for preventing the sliding of the wheels.

As is well known, if the braking force exerted on a vehicle wheel is sufficient to exceed the limit of adhesion or rolling friction of the wheel and the rail on which it rolls, the wheel decelerates at an abnormally rapid rate to a locked or non-rotative condition and slides. As employed herein, the term "slip" refers to the rotation of the vehicle wheels at a speed less than a speed corresponding to vehicle speed at a given instant whereas the term "slide" refers to the dragging of a vehicle wheel along a rail in a locked or non-rotative condition. This distinction between the terms "slip" and "slide" should be borne in mind in the subsequent description of my invention.

Under the most favorable conditions of adhesion or rolling friction between the car wheel and the rail on which it rolls, a certain maximum rate of rotative deceleration of the wheel due to braking is possible without causing the wheel to slip. When the wheel slips, it decelerates at excessively rapid rates never attained while the wheel is not slipping. It has accordingly been proposed to provide various devices of either a mechanical or electrical nature, responsive to a rate of rotative deceleration of a vehicle wheel which occurs only when the wheel slips for automatically and instantly effecting a rapid reduction in the degree of application of the brakes associated with the slipping wheel. This automatic and instantaneous rapid reduction in the degree of application of the brakes associated with the slipping wheel causes the slipping wheel to cease decelerating and begin to accelerate back toward a speed corresponding to car speed without actually decelerating to a locked or non-rotative condition and sliding.

Up to the present time, it has been proposed to provide brake control systems in which the slip-responsive devices are effective to cause reduction in the degree of application of the friction brakes associated with the vehicle wheels. It is an object of my invention to provide a novel brake control apparatus, for a vehicle having both dynamic and friction brakes associated with the vehicle wheels, including slip-responsive devices effective to diminish the braking effect of either the dynamic or the friction brakes, or both, when any of the wheels with which the brakes are associated begins to slip.

More specifically, it is an object of my invention to provide brake control apparatus of the type indicated in the foregoing object and further characterized by a lock-out magnet valve which functions normally under the control of the dynamic brakes to suppress the application of the friction brakes until the degree of dynamic braking effect reduces below a certain degree and which is effective, when the wheels slip, to effect a reduction in the degree of application of the friction brakes associated with the slipping wheels.

The above objects, and other objects of my invention which will be made apparent hereinafter, are attained by means of an illustrative embodiment of my invention shown in the accompanying single figure of the drawing.

Description of equipment

As diagrammatically shown in the single figure of the drawing, the equipment provided is applied to a single car having two four-wheel trucks 11 and 12, respectively referred to hereinafter as the front wheel truck and the rear wheel truck, on the assumption that the car is traveling in the forward or left-hand direction as indicated by the arrow at the bottom of the figure. It will be understood that only two wheels 13 of each truck are shown and that each of the wheels shown in reality represents a pair of wheels fixed at opposite ends of a connecting axle.

In the usual manner of street railway cars, each wheel unit comprising a pair of wheels and the connecting axle has associated therewith a propulsion or driving motor represented in the figure diagrammatically by respective armature and field windings. The motor armature windings of the motors for the wheel units on the front wheel truck 11 are respectively designated 14a and 15a, and the corresponding field windings are respectively designated 14f and 15f. In a similar manner, the motor armature windings of the wheel units of the rear wheel truck are respectively designated 16a and 17a, and the corresponding field windings are respectively designated 16f and 17f.

The supply of propulsion current to the motors is under the control of a propulsion controller 21 and a so-called "deadman" switch device 22. When the "deadman" switch 22 is depressed by the foot or hand of the operator, the propulsion controller 21 is effective to vary the current supplied to the motor to control the acceleration and speed of travel of the car in conventional manner. When the deadman switch 22 is released, the supply of current to the motors is interrupted and a relay 23 hereinafter referred to as the emergency relay, becomes effective to establish a so-called deadman emergency dynamic braking circuit.

The friction brakes associated with the wheels 13 may be of any suitable type such as the conventional clasp shoe type engaging the rim of the wheels which are applied to a desired degree and released by means of fluid pressure operated devices, illustrated as conventional brake cylinders 25. Any desired number of brake cylinders 25 may be provided for each wheel truck although, as shown, two brake cylinders are provided for each truck, each brake cylinder being adapted to operate the brakes associated with a corresponding wheel unit.

Fluid under pressure is supplied from a suitably charged reservoir 26 to the brake cylinders 25 to effect application of the brakes and released therefrom to effect release of the brakes, under the control of the operator, by means of a suitable brake control valve 27 of well-known self-lapping type. A magnet valve device 18, hereinafter referred to as the emergency magnet valve, controlled by the emergency relay 23 also controls the supply of fluid under pressure to and the release of fluid under pressure from the brake cylinders.

Associated with the brake control valve 27, in a manner hereinafter to be more fully described, so as to be operated simultaneously therewith is a dynamic brake controller 28.

According to my invention there is additionally provided a double coil lock-out magnet valve and switch device 29, hereinafter referred to as the lock-out magnet valve, which is effective in accordance with the voltage drop across a resistor 30 in the dynamic braking circuit to close the communication through which fluid under pressure is supplied to the brake cylinder 25 under the control of the brake control valve 27 to prevent the application of the friction brakes until the dynamic brake reduces below a certain degree of effectiveness.

There is further provided, in accordance with my invention, electrical apparatus of known type responsive to the slipping of the car wheels. This apparatus comprises a magneto or direct-current generator 31 for each wheel unit of the wheel trucks 11 and 12 adapted to supply a voltage at the brush terminals thereof substantially proportional to the rotative speed of the corresponding wheel unit. The generators 31 may be mounted on or in the journal at the end of the axle of each wheel unit with the rotary armature of the generator in coaxial relation with and coupled to the end of the axle, as diagrammatically indicated in the drawing.

The opposite brush terminals of each generator 31 are connected, respectively, by suitable wires, to opposite input terminals of a suitable full-wave rectifier 32, illustratively shown as of the dry or copper-oxide disk type, and an electrical condenser 33 of suitable capacity is interposed between one of the generator brush terminals and one input terminal of the rectifier. The other brush terminal of each generator is adapted to be connected and disconnected to the corresponding input terminal of the rectifier 32 by a relay 34 hereinafter referred to as the cut-out relay. As will be apparent, each of the relays 34 has a single contact member which is biased to open position when the operating winding of the relay is deenergized and which is actuated to its picked-up or closed position when the operating winding of the relay is energized. The operating windings of the several cut-out relays 34 are connected in parallel relation across a pair of bus wires 36 and 37.

The bus wire 36 is connected to one terminal of a source of direct-current, such as a storage battery 39, which terminal is hereinafter assumed to be the positive terminal. The bus wire 37 is adapted to be connected to the opposite or negative terminal of the battery 39 when the deadman switch 22 is depressed.

Accordingly, when the deadman switch 22 is depressed as it should normally be during operation of the vehicle, the contact member of each cut-out relay 34 is actuated to its closed position, thereby establishing the connection from the one brush terminal of the generator to the corresponding input terminal of the rectifier 32. Conversely, when the deadman switch 22 is released, the contact member of each cut-out relay 34 is restored to its open position, thus interrupting the connection between the generator and the input terminals of the rectifier.

Associated with each of the rectifiers 32 is a corresponding relay 38, hereinafter referred to as the "slip" relay.

Each of the slip relays 38 has an operating winding that is connected across the output terminals of the corresponding rectifier 32 and a single contact member which is normally biased to open position and which is actuated to picked-up or closed position only when the operating winding of the relay is energized by a current exceeding a certain value determined in the manner hereinafter to be described.

As previously indicated, the arrangement of the generator 31, condenser 33, rectifier 32 and relay 38 is such as to respond to slipping of the corresponding wheel unit. Although apparatus of this character has been previously known and employed for a similar purpose, a brief explanation of the operation thereof is believed desirable.

Assuming that the left-hand and right-hand brush terminals of the generator 31 associated with a wheel unit are of positive and negative polarity respectively when the vehicle is traveling in forward direction, it will be seen that upon acceleration of the car wheels due either to driving of the car by the propulsion motors or due to acceleration of a slipping wheel back toward a speed corresponding to vehicle speed, the voltage across the brush terminals of the generator 31 increases at a rate corresponding to the rate of acceleration of the wheels. The condenser 33 is accordingly charged by a current which flows from the positive brush terminal of the generator to the corresponding input terminal of the rectifier 32, out of the rectifier at the positive output terminal thereof, through the operating winding of the relay 38, into the negative output terminal of the rectifier, and out of the rectifier to the upper terminal or plate of the condenser 33, current flowing simultaneously from the opposite terminal or plate of the condenser 33 to the negative brush terminal of the generator and through the armature winding of the generator to the positive brush terminal.

Assuming a suitable capacity for the condenser 33, the condenser charging current varies substantially in proportion to the rate of increase of the voltage of the axle-driven generator 31 and, accordingly, in proportion to the rate of acceleration of the wheels of the corresponding wheel unit. For normal rates of acceleration of the vehicle wheels such as occur when the propulsion motors accelerate the car, the condenser charging current is insufficient to cause actuation of the contact member of the slip relay 38 to its picked-up or closed position. However, if the vehicle wheels accelerate back toward a speed corresponding to car speed while slipping, the condenser charging current, corresponding to the rate of rotative acceleration of the slipping wheel, exceeds a certain rate which occurs only when the wheel slips. The current required to actuate the contact member of the slip relay 38 to its picked-up or closed position corresponds to this certain rate of rotative acceleration of the car wheels. Thus, unless the car wheels accelerate at a rate exceeding a certain rate, such as ten miles per hour per second, the slip relays 38 are not picked-up.

When the car wheels 13 of a wheel unit decelerate, the voltage at the brush terminals of the corresponding generator 31 decreases at a corresponding rate. A current is accordingly discharged in the circuit from the condenser 33 which flows through the operating coil of the slip relay 38 in the same direction as for acceleration due to the operation of the rectifier 32. Thus when the wheels decelerate, current flows from the upper plate or terminal of the condenser 33 to the connected input terminal of the rectifier 32, thence through the rectifier and out at the positive output terminal thereof, through the winding of the relay 38, into the rectifier 32 at the negative output terminal thereof, through the rectifier and out of the opposite input terminal thereof, through the armature winding of the generator 31 and back to the opposite plate or terminal of the condenser. As in the case of acceleration, so in the case of deceleration of the car wheels, the current flowing in the circuit is proportional to the rate of rotative deceleration of the car wheel.

Since the rate of rotative deceleration of the car wheels while slipping is of the same order of magnitude as the rate of acceleration of the slipping wheel back toward a speed corresponding to car speed, it will be seen that the condenser discharge current flowing in the circuit during deceleration of the slipping wheel exceeds that certain value required to cause pick-up of the contact member of the slip relay 38.

It will thus be seen that whenever the car wheels of a wheel unit exceed a certain rate of rotative deceleration while slipping, the contact member of the slip relay 38 is actuated to its picked-up or closed position just as in the case of acceleration of the wheels at a rate exceeding the certain rate.

When the vehicle travels in the reverse direction, the polarity of the brush terminals of the generators 31 is likewise reversed. However, each rectifier 32 causes the current through the operating coil of the corresponding slip relay 38 to be always in the same direction. Consequently, the slip relays 38 always function in response to the acceleration or deceleration of the corresponding vehicle wheels, notwithstanding a reversal of travel of the vehicle.

As is well known, it is characteristic of relays of the neutral type, such as slip relays 38 are, that once the contact members thereof are actuated to their picked-up positions they may be held therein by a lesser energizing current than was required to cause them to be actuated thereto due to the diminution of the air gap between the armature and the magnetic core structure of the relay. It will thus be understood that while the contact members of the relays 38 are picked-up in response to a certain current they may remain held in their picked-up position by a lesser current. Such fact, however, in no way interferes with or affects the operation of the equipment as hereinafter to be described.

The contact members of slip relays 38 for all of the wheel units on the car are connected in parallel relation, as by two bus wires 41 and 42 and the actuation of any of the contact members to picked-up or closed position is accordingly effective, in the manner hereinafter to be more fully described, to cause pick-up of a relay 43 of the slow-release type. Relay 43 has a suitable operating winding and three contact members designated a, b and c, respectively. The contact members a, b are front-contact members, that is, they are in open position when the winding of the relay is deenergized and are actuated to picked-up or closed position when the relay winding is energized. The contact member c of the relay 43 is a back-contact member, that is, it is in a closed position when the relay winding is deenergized and is actuated to an open position when the relay winding is energized.

The contact member a of the relay 43 is effective when actuated to its picked-up or closed position to effect operation of the lock-out magnet valves 29 independently of the dynamic braking circuit control previously mentioned.

The contact member b of the relay 43 is effective when actuated to closed position to establish a self-holding circuit for the winding of the relay 43, including a pressure operated switch 44 which is responsive to the pressure in the brake cylinders 25 of one of the wheel trucks, such as the rear wheel truck 12. The nature and function of the pressure switch 44 will be explained more fully hereinafter.

The contact member c of the relay 43 is effective in its closed position to shunt a resistor 45 in the dynamic braking circuit of the propulsion motors of the car and is effective when actuated to open position to remove the shunt connection around the resistor, thereby inserting the resistor 45 in the dynamic braking circuit to diminish the current therein.

Before proceeding to a description of the operation of the equipment, a brief description of certain parts of the equipment previously referred to will be helpful and is accordingly given. The propulsion controller 21 is shown diagrammatically in block form but it will be understood that any suitable type of controller may be provided. As diagrammatically shown, the propulsion controller 21 is of the rotary or drum type having a rotary operating shaft 51 which is biased, by means not shown, to a normal "power-off" position and which is advanced progressively through successive positions, to increase the supply of power current to the propulsion motors, by suitable means such as a crank arm 52 and an operating rod 53 which may be connected to a suitable operating handle or foot pedal, not shown. Movement of the operating rod 53 in the left-hand direction, as shown by the arrow, operates the propulsion controller in a direction to increase the current supplied to the propulsion motors to drive the car.

For simplicity, the propulsion motors of the car are indicated as connected in conventional series-parallel relation, one end of the branch connection being grounded and the other being connected by a wire 55 to one terminal of the propulsion controller 52. The other terminal of the propulsion controller is connected, as by a wire 56, to a trolley 57 which in turn runs on a trolley wire 58 connected to an external source of electrical power, not shown.

The deadman switch device 22 is illustrated diagrammatically as comprising an armature carrying in insulated relation thereon two contact-bridging members $a$ and $b$ and having a button or pedal element 61 adapted to be engaged by the hand or foot of the operator. The armature of the deadman switch device is normally biased by a coil spring 62 to a raised position in which the contact members $a$ and $b$ disengage respectively associated and corresponding pairs of stationary contact members. When the operator presses downwardly on the button 61, the contact members $a$ and $b$ are shifted correspondingly into engagement with the associated pairs of contact members to close corresponding circuits.

As will be readily apparent, the contact member $a$ of the deadman switch 22 is effective in its closed position to complete the circuit through the wire 55 from the propulsion controller 21 to the propulsion motors on the car, thereby permitting the supply of propulsion current to the motors.

The contact member $b$ on the deadman switch 22 is effective in its closed position to complete a circuit through the wire 37 to the wire 63 connected to the negative terminal of the battery 39. Thus, when the deadman switch 22 is depressed, the cut-out relays 34 are picked-up to establish the circuits of the generators 31 associated with each of the wheel units.

At the same time, the winding of emergency relay 23 is energized since it is connected across the bus wires 36 and 37. Accordingly, as long as the deadman switch 22 is depressed, the two back-contact members $a$ and $b$ of the emergency relay 23 are actuated to their picked-up or open positions.

The brake control valve 27 is illustrated, for simplicity, in block form and it will be understood that a suitable conventional self-lapping brake valve is intended. As diagrammatically shown, the brake control valve 27 comprises a rotary operating shaft 65 which is normally biased to a certain position in which the self-lapping valve mechanism establishes a communication through which fluid under pressure is exhausted from the brake cylinders through an exhaust port 66 at the brake control valve. As will be readily apparent, the brake cylinders for each wheel truck are connected under the control of the corresponding lock-out magnet valves 29 to a common pipe 68. A branch pipe 69 of the pipe 68 is connected alternatively, through a double check valve 70, to the brake cylinder supply pipe 67 of the brake control valve 27 or to the brake cylinder supply pipe 77 of the emergency magnet valve 18.

The rotary operating shaft 65 of the brake control valve 27 is adapted to be rotatively shifted, as by a crank arm 71 fixed thereto and an operating rod 72 pivoted on the arm 71. Rod 72 is moved in the left-hand direction by depression of a foot pedal (not shown) to cause the brake control valve 27 to supply fluid under pressure from the reservoir 26 through pipes 67, 69 and 68 to the brake cylinders, the pressure established in the brake cylinders corresponding or being proportional to the degree of rotary displacement of the operating shaft 65 out of its normal position.

The emergency magnet valve 18 is illustrated as a conventional magnet valve of the double-beat valve type and accordingly only a functional description thereof is deemed necessary. The magnet winding of the magnet valve 18 is energized and deenergized under the control of the back-contact member $b$ of emergency relay 23. Thus, when emergency relay 23 is picked-up, as it normally is, the magnet winding of magnet valve 18 is deenergized. In such case, the double beat valve is biased to its upper seated position to connect brake cylinder pipe 77 to atmosphere through the exhaust port of the magnet valve. When emergency relay 23 is dropped out, the circuit for energizing the magnet winding of the magnet valve 18 is completed due to restoration of contact member $b$ of relay 23 to closed position. The double beat valve is thus actuated to its lower seated position to close the exhaust communication just described and at the same time connect the brake cylinder supply pipe 77 to a pipe 80 connected to the reservoir 26. Fluid under pressure is thus supplied directly to the brake cylinders 25 by the emergency magnet valve 18, independently of the brake control valve 27, the pressure established in the brake cylinders corresponding to the fluid pressure supplied from the reservoir 26.

It will be apparent that the shiftable valve element of the double check valve 70 is automatically shifted in conventional manner to the proper position for establishing the connection between either pipe 67 or 77 and pipe 69 by the pressure of the fluid supplied into the pipes 67 and 77.

The dynamic brake controller 28 may be of any suitable type having a rotary operating shaft 73 and a resistor 74, varying amounts of which are cut-in or cut-out of the dynamic braking circuit of the propulsion motors upon rotation of the operating shaft 73.

As diagrammatically shown, the dynamic brake controller 28 comprises an operating arm 75 fixed to the operating shaft 73, one end of the arm being pivotally connected to the operating rod 72, through a slotted connection in the manner indicated, and the other end being provided with an insulated contact tip 76 adapted to engage and move over tap connections of the resistor 74. In the normal position of the arm 75, the contact tip 76 disengages the end tap connection of the resistor 74, thereby interrupting the dynamic braking circuit. When the operator depresses the brake pedal and thereby shifts the brake rod 72 in the left-hand direction, the operating arm 75 is rotated in correspondence with the rotation of the operating shaft 65 of the brake control valve 27. Upon a very slight angular displacement of the operating arm 75 out of its normal position in a clockwise direction, the contact tip 76 engages the end tap connection of the resistor 74, thereby completing the dynamic braking circuit for the propulsion motors of the car. As the displacement of the operating arm 75 in a clockwise direction out of its normal position increases, an increasing amount of the resistor 74 is cut-out of the dynamic braking circuit, thereby permitting a greater dynamic braking current to flow and a proportionally greater dynamic braking effect to be produced.

The operating arm 75 of the dynamic brake controller is also provided with an insulated contact member 78 which is normally out of engagement with an arcuate contact segment 79 but which engages the segment and continues in engagement therewith as the operating arm 75 is displaced out of its normal position. The contact element 78 and contact segment 79 form a switch device which is closed whenever the dynamic braking circuit is established by operation of the dynamic brake controller. Obviously, various equivalents of such a switch device will occur to the mind of those skilled in the art.

The switch formed by the cooperation of the contact element 78 and contact segment 79 is adapted to connect the bus wire 36 to the bus wire 41. Accordingly, when any of the slip relays 38 is actuated to its closed position, a circuit is established for energizing the operating winding of the relay 43 since opposite terminals of the winding of the relay 43 are connected to the bus wire 42 and to the negative battery wire 63.

The lock-out magnet valves 29 for the respective wheel trucks are identical in construction and accordingly only one is shown in complete detail and will be described.

Each lock-out magnet valve 29 comprises a suitable sectionalized casing, the parts of which are adapted to be secured together with suitable sealing gaskets and securing bolts or screws not shown. Carried in a suitable chamber formed in the upper portion of the casing are two concentrically arranged insulated solenoids or electromagnetic windings 81 and 82. As shown, the solenoid 81 is within the solenoid 82. Suitably guided in a bushing within the inner solenoid 81 is a plunger 83 having upper and lower stems. Fixed in insulated relation on the upper stem of the plunger 83 is a contact-bridging member 84 which cooperates with a pair of stationary contact members 85 carried by the casing in a manner not shown.

When either of the solenoids 81 or 82 is energized by a sufficient current, the plunger 83 is shifted downwardly due to the magnetic force exerted thereon and the lower stem of the plunger engages and shifts a double-beat valve 86 from an upper seated position, to which it is urged by a valve spring 87, to a lower seated position against the force of the spring 87. At the same time, the downward movement of the plunger 83 is effective to disengage the contact-bridging member 84 from its associated pair of contact members 85, thereby opening a shunt connection around a resistor 88 in the circuit of the corresponding solenoid winding 81 and the purpose of which will be made apparent hereinafter.

The double-beat valve 86 is contained in a chamber 89 which is constantly connected to the associated brake cylinders 25 by a branch pipe 68a. With valve 86 in its upper seated position, communication is established past the lower valve seat of the valve 86 through a port controlled by the valve to a chamber 91 to which the pipe 68 is connected. Thus, with the valve 86 in its upper seated position, fluid under pressure may be supplied from the reservoir 26 to the brake cylinder 25 under the control of the brake control valve 27 or the emergency magnet valve 18.

When the valve 86 is shifted to its lower seated position, the supply communication just described is closed and communication is established between the chamber 89 and a chamber 92 which is constantly connected to atmosphere through a relatively large port 93 so that fluid under pressure is released from the brake cylinders. Accordingly, the friction brakes are either suppressed or released, as the case might be, upon operation of the lock-out magnet valve.

The solenoid 81 of each of the lock-out magnet valves 29 is connected and subject to the voltage-drop across the resistor 30 in the dynamic braking circuit of the propulsion motors, and is accordingly energized in accordance with the dynamic breaking current. The resistor 30 is of such character that when the dynamic braking current exceeds a certain value, the voltage-drop across the resistor 30 and impressed on the respective solenoids 81 of the two lock-out magnet valves 29 causes energization of the solenoids 81 to a sufficient degree to shift the contact-bridging member 84 to its open position and the double-beat valve 86 from its upper seated to its lower seated position.

In view of the fact that after the plunger 83 of each lock-out magnet valve is actuated downwardly a lesser energizing current for the solenoid 81 is required to maintain the plunger displaced downwardly, it is apparent that the valve 86 will not be restored to its upper seated position until the current energizing the solenoid 81 reduces substantially below the current required to cause actuation of the plunger downwardly. In order to cause the valve 86 to be operated from one position to the other in response to an increase or a decrease of current in the dynamic braking circuit above or below a certain critical value, I have accordingly provided the resistor 88, which is adapted to be inserted in the branch circuit of each corresponding solenoid 81 by contact-bridging member 84 removing the shunt connection thereon when the solenoid is sufficiently energized to shift the valve 86 to its lower seated position. It will be understood that resistor 88, when inserted in circuit with the solenoid 81, so reduces the voltage impressed on the solenoid winding 81 that when the current in the dynamic braking circuit reduces slightly below the value corresponding to that at which the double-beat valves 86 were actuated downwardly to the lower seated position thereof, the energization of the solenoids 81 will be so reduced as to permit the valves 86 to be restored upwardly to the upper seated position. Once the plungers 83 are restored upwardly to the uppermost position thereof, the contact-bridging member 84 restores the shunt connection around the resistor 88. However, due to insufficient current in the dynamic braking circuit, the potential impressed on the solenoids 81 is at such time insufficient to cause the valves 86 to again be actuated downwardly to their lower seated position.

The outer solenoids 82 of the two lock-out magnet valves 29 are connected in parallel relation by two wires 95 and 96. The wire 95 is connected to the negative battery wire 63 by a wire 97, and the wire 96 is connected to the bus wire 36 by a wire 98 which includes the contact member a of the relay 43. Accordingly, when the contact member a of the relay 43 is actuated to its picked-up or closed position, a circuit is established for energizing the solenoids 82 to a sufficient degree to actuate the double-beat valves 86 downwardly to the lower seated position thereof independently of the solenoids 81, which may or may not be simultaneously energized.

Operation of equipment

Let it be assumed that the car is traveling along the road under power at a relatively high speed, the operator maintaining the deadman switch 22 depressed and depressing the foot pedal operating the propulsion controller 21 to supply propulsion current to the car motors.

To effect an application of the brakes, the operator first releases the operating foot pedal of the propulsion controller 21 which is thus automatically restored to "power-off" position interrupting the supply of propulsion current to the car motors. The operator then depresses the brake pedal so as to shift the brake operating rod 72 in the left-hand direction to simultaneously operate the dynamic brake controller 28 and the brake control valve 27.

Upon a sufficient displacement of the operating arm 75 of the dynamic brake controller 28 in a clockwise direction, the contact tip 76 engages the end tap connection of the resistor 74 to complete the dynamic braking circuit for the motors. This circuit may be traced from the point of connection between one brush terminal of the motor armature 15a and the one terminal of the field winding 15f by way of the wire 101 including a flexible portion to permit movement of the operating arm 75 of the dynamic brake controller, contact tip 76, resistor 74, a wire 102 including the resistors 30 and 45 in series relation therein to the point of connection between one brush terminal of the motor armature 16a and one terminal of the field winding 16f where the circuit divides into two branches, one branch extending by way of the motor armatures 16a, 17a and field windings 14f and 15f to the original point and the other branch extending by way of the field windings 16f, 17f and motor armature windings 14a and 15a to the original point.

At the same time, the contact element 78 engages the contact segment 79 to connect the positive bus wire 36 to the bus wire 41, which operation is without immediate effect.

With the car traveling at a relatively high speed, the current flowing in the dynamic braking circuit establishes a voltage-drop across the resistor 30 sufficient to cause energization of the solenoids 81 of the lock-out magnet valves 29 to actuate the valves 86 downwardly to the lower seated position thereof. Thus, although the brake control valve 27 is operated to initiate the supply of fluid under pressure from the reservoir 26 to the pipe 68, fluid under pressure cannot be supplied to the brake cylinders 25 to effect application of the friction brakes. The application of the friction brakes is thus suppressed.

In the event that the time of build-up of the dynamic braking current is such as to permit a momentary supply of fluid under pressure to the brake cylinders 25, such fluid under pressure will be of negligible quantity and will furthermore be instantly vented to atmosphere when the lock-out magnet valves 29 are operated in response to the dynamic braking current.

It will be apparent that the degree of displacement of the operating arm 75 of the dynamic brake controller 28 out of its normal position controls the amount of the resistor 74 included in the dynamic braking circuit and thereby controls the dynamic braking current. Since the dynamic braking torque or effect on the car wheels is proportional to the dynamic braking current, it will be seen that the degree of displacement of the operating arm of the dynamic brake controller out of its normal position controls the degree of dynamic braking effect. Thus if the operator depresses the foot pedal operating the brake operating rod 72 to its fullest extent, the entire resistor 74 is cut out and a maximum dynamic braking current flows in the circuit to produce a maximum dynamic braking effect.

The characteristic curve of dynamic braking current is relatively flat or of constant value as the speed of the car reduces until the speed of the car reduces below a certain value, such as fifteen miles per hour, at which time the dynamic braking current falls off rapidly to zero. Accordingly when the car reduces below a certain speed, such as fifteen miles per hour, the voltage-drop across the resistor 30 in the dynamic braking circuit will correspondingly reduce. The solenoid 81 of the lock-out magnet valves 29 will thus be insufficiently energized and the double-beat valves 86 will be restored to their upper seated positions. As a result of the restoration of the double-beat valves 86 of the lock-out magnet valve 29 to their upper seated positions, communication is established from the pipe 68 to the brake cylinders 25 of each wheel truck and fluid under pressure is accordingly supplied to the brake cylinders to effect application of the friction brakes to a degree determined by the pressure of the fluid supplied to the brake cylinder. The pressure of the fluid supplied to the brake cylinders is in turn determined by the degree of displacement of the rotary operating shaft 65 of the brake control valve 27 out of its normal position. Thus, if the operating arm 75 of the dynamic brake controller 28 is displaced in a clockwise direction a maximum amount, a maximum pressure will be established in the brake cylinders 25. The degree of application of the friction brakes established when the lock-out magnet valves 29 are restored to their normal positions in response to the fading of the dynamic braking effect corresponds therefore in degree to the degree of dynamic braking effect.

When the pressure in the brake cylinders 25 associated with the rear wheel truck 12 exceeds a certain pressure such as ten pounds per square inch, the contact member of the pressure switch 44 is actuated to its closed position and remains in its closed position thereafter until the brake cylinder pressure is restored to a value below ten pounds per square inch, at which time the contact member is restored to its open position.

The operation of the pressure switch 44 to its closed position is without effect unless the relay 43 is picked-up. As will be explained hereinafter, the relay 43 is not picked-up unless one or more of the car wheels begin to slip. In the present instance, it is assumed that none of the car wheels begin to slip and thus the operation of the pressure switch 44 to its closed position is without effect.

When the car comes to a stop in response to the application of the brakes, the friction brakes remain applied according to the degree of fluid pressure established in the brake cylinders 25. Before starting the car again, therefore, the operator must release the brake pedal to permit the dynamic brake controller 28 and the brake control valve 27 to be restored to their normal condition. In its normal condition, the operating arm 75 of the dynamic brake controller effects disengagement of the contact tip 76 from the end tap connection of the resistor 74 and accordingly interrupts the dynamic braking circuit. In its normal position, the rotary operating shaft 65 of the brake control valve 27 is effective to cause operation of the self-lapping mechanism thereof to release the fluid under pressure from the brake cylinders 25 through the exhaust port 66 at the brake control valve, thereby completely releasing the brakes.

Let it now be assumed that during an application of the brakes, the wheels of one of the wheel units such as the trailing wheel unit of the rear wheel truck 12 begin to slip. In such case, therefore, the corresponding slip relay 38 is picked-up and the contact member thereof actuated to its closed position to establish a circuit for energizing the winding of the relay 43. This circuit may be traced from the positive terminal of the battery 39 by way of the positive bus wire 36, branch wire 104 including a flexible portion attached to the contact element 78 of the operating arm of the dynamic brake controller 28, arcuate contact segment 79, a wire 105, bus wire 41, the contact member of the slip relay 38 corresponding to the slipping wheel unit, bus wire 42, a wire 106 including the winding of the relay 43, and wire 63 back to the negative terminal of the battery 39.

Assuming that the current in the dynamic braking circuit is sufficient at the time the wheel slips to operate the lock-out magnet valve 29 to prevent the supply of fluid under pressure to the brake cylinders 25, the actuation of the contact member b of the relay 43 to its closed position is ineffective to establish a holding circuit for the winding of the relay 43 because the pressure switch 44 is open. Thus the relay 43 is energized only so long as the contact member of the slip relay 38 corresponding to the slipping wheel unit remains in closed position.

With the operating winding of the relay 43 energized under the control of the slip relay, the back-contact member c of the relay 43 is actuated to its open position to remove the shunt connection around the resistor 45, thus inserting the additional resistance of the resistor 45 in the dynamic braking circuit and instantly reducing the dynamic braking current in the circuit. Due to the insertion of the resistor 45 in the dynamic braking circuit, the dynamic braking current and, proportionately, the dynamic braking effect is so reduced as to permit the slipping wheels to cease to decelerate and begin to accelerate back toward a speed corresponding to vehicle speed without actually attaining the locked or non-rotative condition and sliding.

When the slipping wheels change from deceleration to acceleration, the current energizing the winding of the slip relay 38 momentarily reduces below a value sufficient to maintain the contact member of the relay in closed position. Due to the inherent operating lag of the relay 38, however, the contact member thereof may remain in its closed position during the period of transition of the slipping vehicle wheels from deceleration to acceleration. If the contact member of the slip relay 38 should be restored momentarily to its open position during the period of transition of the slipping vehicle wheels from deceleration to acceleration, the circuit for energizing the winding of the relay 43 will be momentarily interrupted. The contact members of the relay 43 will not, however, be restored to their normal positions because the relay 43 is a slow-release relay, that is, the contact members thereof are maintained for a fraction of a second in their picked-up positions following deenergization of the winding of the relay before being restored to their normal positions.

Thus, even if the contact member of the slip relay 38 does momentarily open, it will be reclosed due to acceleration of the slipping wheels before the expiration of a sufficient time for the contact members of the relay 43 to be restored to their normal positions thereof. Accordingly, the winding of the relay 43 will again be energized due to the reclosing of the contact member of the slip relay. Thus the contact members of the relay 43 will not drop-out while the slipping wheels are changing from deceleration to acceleration.

When the rate of rotative acceleration of the slipping wheels falls off sufficiently as the slipping wheels approach a speed corresponding to car speed, the contact member of the slip relay 38 is restored to its open position and the energizing circuit for the relay 43 is interrupted. At this time, the contact members of the relay 43 are restored from their picked-up to their dropped-out position after the expiration of the release time of the relay.

Upon the restoration of the back-contact member c of relay 43 to its closed position shunting the resistor 45, the current in the dynamic braking circuit may again increase to a higher value corresponding to the speed of the car at such time. It will be noticed, however, that such restoration of the normal braking current is not effected until the slipping wheels are restored to a speed corresponding substantially to car speed.

If the slipping of the wheels was due to a momentary low adhesion condition between the wheels and the rails, the restoration of the higher normal dynamic braking current will not necessarily cause the wheels to again immediately slip. If the slipping of the wheels was caused by a continued low adhesion condition, the restoration of the normal dynamic braking current may again cause the wheels to slip. If this occurs, the above operation is repeated, the resistor 45 being automatically reinserted in the circuit to diminish the dynamic braking current each time the wheels begin to slip so that at no time are the wheels permitted to decelerate to a locked condition and slide.

If the wheels begin to slip after the dynamic braking current is reduced sufficiently to permit restoration of the lock-out magnet valve 29 to the position in which fluid under pressure is supplied to the brake cylinders 25 so that the friction brakes are effective, a further operation occurs. Due to the fact that the pressure switch 44 is actuated to its closed position by the pressure in the brake cylinders 25, the pick-up of the relay 43 due to the operation of the slip relay 38 is effective to establish a holding circuit for maintaining the winding of the relay 43 energized independently of the slip relay 38. This circuit extends from the positive terminal of the battery 39 by way of the positive bus wire 36, branch wire 104, contact element 78 and contact segment 79 of the dynamic brake controller 28, wire 105, a branch wire 108 including the contact member b of the relay 43 and pressure switch 45 in series relation therein, wire 106 including the winding of the relay 43, and wire 63 back to the negative terminal of the battery 39. Accordingly, once the winding of the relay 43 is energized, it is maintained energized thereafter until the pressure switch 44 is opened in the manner presently to be described.

When the contact member a of the relay 43 is actuated to its picked-up or closed position, a circuit is established for energizing the solenoids 82 of both of the lock-out magnet valves 29. This circuit extends from the positive terminal of the battery 39 by way of the positive bus wire 36, a branch wire 98 including the contact member $a$ of the relay 43, solenoids 82 of both lock-out magnet valves 29 in parallel relation, wire 97, and wire 63 back to the negative terminal of the battery 39.

The valves 86 of the lock-out magnet valves 29 are accordingly actuated to their lower seated positions in response to the energization of the solenoids 82 to cut off the supply of fluid under pressure to the brake cylinders and at the same time effect a rapid reduction of the pressure in the brake cylinders by exhaust of fluid under pressure therefrom through the exhaust port 93 of each of the lock-out magnet valves.

At the same time, the operation of the back-contact member $c$ of the relay 43 to open position inserts the resistor 45 in the dynamic braking circuit to diminish the remaining dynamic braking current.

Due to the simultaneous reduction of the dynamic braking current and of the pressure in the brake cylinders, the degree of dynamic braking effect and the degree of braking effect exerted by the friction brakes is instantly and rapidly reduced and the slipping wheels correspondingly cease to decelerate and begin to accelerate back toward a speed corresponding to car speed.

When the pressure in the brake cylinders 25 of the rear wheel truck 12 reduces below a certain value such as ten pounds per square inch, the pressure switch 44 is restored to its open position interrupting the holding circuit previously traced for maintaining the winding of the relay 43 energized. Due to the fact that the slipping wheels accelerate very rapidly back toward a speed corresponding to car speed, the pressure in the brake cylinders 25 is not reduced sufficiently to open the pressure switch 44 before the slipping wheels are restored fully to a speed corresponding to car speed.

When the pressure switch 44 opens, the contact members of the relay 43 are restored, after the expiration of the release time of the relay, to their normal positions. The circuit for the solenoids 82 of the two lock-out magnet valves 29 is thus interrupted due to the restoration of the contact member $a$ of the relay 43 to its open position and the valves 86 of the lock-out magnet valves are accordingly restored to their upper seated positions restoring the communication through which fluid under pressure is supplied to the brake cylinders. Fluid under pressure is accordingly resupplied to the brake cylinders, the pressure established in the brake cylinders being determined by the displacement of the rotary operating shaft 65 of the brake control valve 27 out of its normal position.

At the same time, the restoration of the back-contact member $c$ of relay 43 to its closed position shunts the resistor 45 and thus permits a corresponding increase in the dynamic braking current in the dynamic braking circuit.

If the slipping of the wheels is caused by a momentary low adhesion of the wheels to the rails, the restoration of the pressure in the brake cylinders will not necessarily cause a repetition of the slipping. If the slipping of the wheels is due to a continued low adhesion condition of the wheels and rails, the restoration of the pressure in the brake cylinders and the consequent re-application of the friction brakes may effect a repeated slipping of the wheels. In such case, however, the above operation is repeated. Thus at no time are the wheels permitted to decelerate to a locked condition and slide.

If, while the car is traveling along the road under power with the propulsion controller 21 effective to cause propulsion current to be supplied to the car motors, the operator accidentally or intentionally releases the downward pressure on the deadman switch 22, an emergency application of the brakes is effected.

Upon the release of the deadman switch 22, the contact members $a$ and $b$ thereof are shifted upwardly to their open positions. Contact member $a$ of the deadman switch 22 interrupts the circuit supplying propulsion current to the motors, while the contact member $b$ interrupts the circuit for energizing the cut-out relays 34 and the emergency relay 23.

Due to the deenergization of the cut-out relays 34, the contact members thereof are restored to their open positions and consequently the circuit between each of the generators 31 and its corresponding rectifier 32 is interrupted. Accordingly no current is supplied to the slip relays 38 and consequently these relays are not operated during a "deadman" emergency application of the brakes.

The deenergization of the operating coil of the emergency relay 23 causes the two back-contact members $a$ and $b$ thereof to be restored to their closed positions. Contact member $a$ of relay 23 is effective in its closed position to establish "deadman" emergency application dynamic braking circuit which extends from the point of connection between one brush terminal of the armature winding 15$a$ and field winding 15$f$ by way of the wire 101, a branch wire 111, contact member $a$ of the emergency relay 23, wires 112 and 113, wire 102 including the resistors 30 and 45 in series relation, the latter being shunted by the contact member $c$ of the relay 43, to the point of connection between the armature winding 16$a$ and corresponding field winding 16$f$ and thence back to the original point in the manner previously described.

It will be apparent that the resistor 74 of the dynamic brake controller 28 is entirely cut-out of the deadman emergency dynamic braking circuit and consequently the maximum degree of dynamic braking effect is produced.

As in the case of a dynamic brake application effected under the control of the operator, the solenoids 81 of the lock-out magnet valves 29 are correspondingly energized, in accordance with the voltage-drop across the resistors 30 in the dynamic braking circuit, to operate the valves 86 to their lower seated positions, thus preventing the supply of fluid under pressure to the brake cylinders 25 until the dynamic braking current reduces sufficiently to permit the restoration of the valves 86 to their upper seated positions.

The contact member $b$ of the emergency relay 23 is effective in its dropped-out or closed position to establish a circuit for energizing the magnet winding of the emergency magnet valve 18. This circuit extends from the positive terminal of the battery 39 by way of the positive bus wire 36, a branch wire 115, contact member $b$ of relay 23, a wire 116 including the magnet winding of the emergency magnet valve 18, and wire 63 back to the negative terminal of the battery 39.

The emergency magnet valve 18 is thus operated to supply fluid under pressure directly from the main reservoir 26 to the pipe 68.

Accordingly, when the dynamic braking current reduces sufficiently that the double-beat valve 86 of each lock-out magnet valve 29 is restored to its upper seated position, fluid is supplied to the brake cylinders 25 at a pressure corresponding to that in the main reservoir.

It will thus be observed that in a deadman emergency application of the brakes, the dynamic brakes are first effective and then upon the diminution of dynamic braking current below a certain degree, the friction brakes are applied to a maximum degree. It will also be observed that during a deadman emergency application of the brakes, the slip relays 38 are non-operative and consequently no protection is afforded against sliding of the wheels. However, since the stopping of the car is the paramount desire during a deadman emergency application of the brakes, the sliding of the wheels in such instance is of secondary importance and is, therefore, tolerated.

In order to release the brakes after a deadman emergency application of the brakes, prior to starting the car, it is first necessary for the operator to depress the deadman switch 22 in order to pick-up the emergency relay 23 and thus deenergize the magnet winding of the emergency magnet valve 18. With the winding of the emergency magnet valve deenergized, the double beat valve thereof is restored to its upper seated position and fluid under pressure is accordingly exhausted from the brake cylinders through the exhaust port of the emergency magnet valve. Upon the subsequent application of the brakes by the operator through the medium of the brake control valve 27, the supply of fluid under pressure through the pipe 67 automatically shifts the valve element of the double check valve 70 to close the exhaust communication through the exhaust port of the emergency magnet valve and at the same time establish communication to pipe 69 leading to the brake cylinders.

*Summary*

Summarizing, it will be seen that I have provided a vehicle wheel brake control equipment having dynamic brakes and friction brakes associated with the vehicle wheels. According to my invention, a wheel-slip responsive device is provided for each wheel unit and is effective to automatically reduce the degree of dynamic braking effect or the degree of application of the friction brakes, or both, if the degree of application of the brakes is such as to cause slipping of the wheels, thereby causing the slipping wheels to return to a speed corresponding to the car speed without actually sliding.

The equipment also includes an arrangement whereby the wheel-slip responsive devices are cut out of operation during a deadman emergency application of the brakes so that no protection against wheel sliding is provided during such application of the brakes.

While I have shown and described only one illustrative embodiment of my invention, various omissions, additions and modifications may be made therein without departing from the spirit of my invention. It is accordingly not my intention to limit the scope of my invention except in accordance with the terms of the appended claims.

Having now described my invention, what I claim as new and desire to secure by Letters Patent, is:

1. Vehicle wheel brake apparatus comprising, in combination, dynamic brake means associated with a vehicle wheel, means for varying the degree of braking effect produced by the dynamic brake means, and means operatively responsive to the rate of change of speed of said wheel for controlling the last said means.

2. Vehicle wheel brake apparatus comprising, in combination, dynamic brake means associated with the wheels of the vehicle, means for varying the degree of braking effect produced by the dynamic brake means, and means responsive to the slipping of individual wheel units of the vehicle for rendering the last said means effective.

3. In a vehicle of the type having electric propulsion motors associated with individual wheel units of the vehicle, the combination of means under the control of the operator for causing said motors to act as dynamic brakes, means adapted to reduce the degree of braking effect produced by said motors when acting as dynamic brakes, and means responsive to the slipping of individual wheel units of the vehicle upon an application of the dynamic brakes for rendering the last said means effective, whereby to cause the slipping wheels to return to a speed corresponding to vehicle speed.

4. Vehicle wheel brake apparatus comprising dynamic brake means associated with the wheel units of the vehicle, a resistor effective to cause a reduction in the degree of braking effect produced by the dynamic brake means, and means operatively responsive to the rate of change of speed of individual wheel units of the vehicle for rendering said resistor effective or non-effective.

5. Brake apparatus for a vehicle of the type having electric propulsion motors associated with individual wheel units of the vehicle comprising, in combination, a dynamic braking circuit including said propulsion motors acting as dynamic brakes, means under the control of the operator for establishing said circuit, means for varying the resistance of the dynamic braking circuit whereby to vary the degree of braking effect produced by the said motors acting as dynamic brakes, and means operatively responsive to the rate of change of speed of individual wheel units for controlling the last said means.

6. Vehicle wheel brake apparatus for a vehicle of the type having electric propulsion motors associated severally with the individual wheel units of the vehicle comprising, in combination, a dynamic braking circuit including said motors acting as dynamic brakes, means under the control of the operator for establishing said circuit, a resistor in said circuit, means normally establishing a shunt connection around said resistor, means effective in response to the slipping of one or more individual wheel units of the vehicle for causing said last means to remove the shunt connection around said resistor whereby to render said resistor effective to reduce the dynamic braking current and therefore the degree of braking effect produced by the motors when acting as dynamic brakes.

7. Brake apparatus for a vehicle of the type having electric propulsion motors associated with the wheel units of the vehicle comprising, in combination, a dynamic braking circuit including the said motors acting as dynamic brakes, means under the control of the operator for establishing said circuit, a resistor in said circuit, a slow-release relay having a back-contact member normally shunting said resistor, and means responsive to the deceleration or acceleration of any of the wheel units on the vehicle at a slipping rate for causing the pick-up of said slow-release relay so as to remove the shunt connection around said resistor, said slow-release relay being adapted to remain picked-up due to its slow-release characteristic during the transition of a slipping wheel unit from deceleration to acceleration, whereby said resistor remains cut-into the dynamic braking circuit from the instant a wheel unit of the vehicle wheel begins to slip until the slipping wheel unit returns substantially to a speed corresponding to vehicle speed.

8. Vehicle wheel brake apparatus comprising, in combination, dynamic brake means, friction brake means, means under the control of the operator for initiating simultaneously an application of the dynamic brake means and of the friction brake means, means effective as long as the dynamic brake means exceeds a certain degree of effectiveness for suppressing the application of the friction brake means, and means effective upon the slipping of any of the wheel units of the vehicle for causing a reduction in the degree of effectiveness of the dynamic brake means and/or a reduction in the degree of application of the friction brake means, whereby to cause the slipping wheel to return to a speed corresponding to vehicle speed.

9. Vehicle wheel brake apparatus comprising dynamic brake means, friction brake means, means under the control of the operator for simultaneously initiating an application of the dynamic brake means and of the friction brake means, suppression means controlled according to the degree of effectiveness of the dynamic brake means for preventing application of the friction brake means as long as the dynamic brake means exerts a braking effect exceeding a certain degree, and means responsive to the slipping of a wheel unit of the vehicle occurring during application of the friction brake means for causing operation of the suppression means, independently of the degree of braking effect exerted by the dynamic brake means, to release the friction brake means.

10. Vehicle wheel brake apparatus comprising dynamic braking means, friction brake means, fluid pressure responsive means for effecting application and release of the friction brake means, means under the control of the operator for simultaneously initiating an application of the dynamic brake means and a variation of the fluid pressure acting on the fluid pressure responsive means so as to cause application of the friction brake means, a lock-out magnet valve for preventing variation of the fluid pressure acting on the fluid pressure responsive means and the consequent application of the friction brake means as long as the dynamic brake means exerts a braking effect exceeding a certain degree, and means responsive to the slipping of a wheel unit occurring during application of the friction brake means for causing operation of the lock-out magnet valve to release the friction brake means.

11. Vehicle wheel brake apparatus comprising, in combination, dynamic brake means, friction brake means, fluid pressure responsive means for effecting the application and release of the friction braking means, means under the control of the operator for simultaneously initiating an application of the dynamic brake means and a variation of fluid pressure acting on the fluid pressure responsive means so as to cause application of the friction brake means, a lock-out magnet valve adapted to prevent a variation of the fluid pressure acting on the fluid pressure responsive means and consequently to prevent application of the friction brake means as long as the dynamic braking means exerts a braking effect exceeding a certain degree, means for reducing the degree of braking effect exerted by the dynamic brake means, and means responsive to the slipping of a wheel unit of the vehicle occurring during application of both the dynamic brake means and the friction brake means for rendering the last said means effective to cause a reduction in the degree of braking effect exerted by the dynamic brake means and also the operation of the lock-out magnet valve to so control the pressure acting on the fluid pressure operated means as to effect the release of the friction brake means.

12. Vehicle wheel brake apparatus comprising a dynamic brake means including a circuit in which dynamic braking current flows, friction brake means, fluid pressure operated means effective upon the supply of fluid under pressure thereto to cause application of the friction brake means and upon the release of fluid under pressure therefrom to cause release of the friction brake means, means under the control of the operator for simultaneously establishing said circuit and initiating the flow of fluid under pressure to the fluid pressure operated means, a lock-out magnet valve having two separate operating windings, one of said windings being effective as long as the current in the said circuit exceeds a certain value for preventing the supply of fluid under pressure to the said fluid pressure operated means and at the same time releasing fluid under pressure therefrom, and means responsive to the slipping of a wheel unit of the vehicle for rendering the other of said windings of the lock-out magnet valve effective, independently of the current in the dynamic braking circuit, to cause a release of fluid under pressure from the fluid pressure operated means.

13. Vehicle wheel brake apparatus comprising dynamic brake means including a circuit in which dynamic braking current flows, friction brake means, fluid pressure operated means adapted upon the supply of fluid under pressure thereto to effect application of the friction brake means and upon the release of fluid under pressure therefrom to effect the release of the friction brake means, means under the control of the operator for simultaneously establishing said circuit and initiating the supply of fluid under pressure to the fluid pressure operated means, a lock-out magnet valve having two separate windings, one of said windings being effective as long as the current of the dynamic braking circuit exceeds a certain value for causing the magnet valve to prevent the supply of fluid under pressure to the fluid pressure operated means and at the same time effect a release of fluid under pressure therefrom, a resistor in said circuit, means normally shunting said resistor, and means responsive to the slipping of a wheel unit of the vehicle for effecting operation of the last said means to remove the shunt connection around the said resistor and at the same time cause the other of said windings of said lock-out magnet valve to operate the magnet valve to release fluid under pressure from the pressure operated means.

14. Vehicle wheel brake apparatus comprising dynamic brake means, friction brake means, means for simultaneously initiating an application of the dynamic brake means and the friction brake, means effective as long as the dynamic brake means exerts a braking effect exceeding a certain degree for preventing application of the friction brake means, means effective in response to the slipping of a wheel unit when both the dynamic brake means and the friction brake means exert a braking effect for effecting a reduction in the degree of braking effect exerted by the dynamic brake means and a continuing reduction in the degree of application of the friction brake means, and means controlled according to the degree of application of the friction brake means for restoring the dynamic brake means to a higher degree of effectiveness and initiating an increase in the degree of the application of the friction brake means only after the degree of application of the friction brake means is reduced below a certain value.

15. In a vehicle of the type having electric propulsion motors associated with wheel units of the vehicle, the combination of a dynamic braking circuit including said motors acting as dynamic brakes, means under the control of the operator for establishing said dynamic braking circuit, a power circuit for supplying propulsion current to said motors, a power controller under the control of the operator for establishing said power circuit and controlling the degree of current therein, a deadman switch device in said power circuit normally effective when held depressed by the operator to render the power controller effective and adapted upon release by the operator to interrupt said power circuit and establish said dynamic braking circuit independently of the first said means under the control of the operator, means responsive to the slipping of a wheel unit of the vehicle during an application of the dynamic brakes for effecting a reduction in the degree of braking effect exerted by the dynamic brakes whereby to cause the slipping wheel unit to be restored to a speed corresponding to vehicle speed without sliding, and means effective when the deadman device is released for rendering said wheel-slip responsive means non-effective.

16. Vehicle wheel brake apparatus comprising, in combination, dynamic brake means including a dynamic braking circuit, friction brake means, means under the control of the operator of the vehicle for establishing the dynamic braking circuit to cause application of the dynamic brake means and, simultaneously therewith, initiating application of the friction brake means, a lock-out magnet valve having a magnet winding, means for causing such energization of the magnet winding of said lock-out magnet valve when the current in the dynamic braking circuit increases above a certain value as to cause operation of the lock-out magnet valve from one position in which it permits the application of the friction brake means to a different position in which it prevents the application of the friction brake means, and means effective when the lock-out magnet valve is in its said different position for so controlling the current energizing the magnet winding of the lock-out magnet valve that the lock-out magnet valve is restored thereafter to its said one position when the current in the dynamic braking circuit reduces below a value substantially the same as said certain value.

17. Vehicle wheel brake apparatus comprising, in combination, dynamic brake means including a dynamic braking circuit having a resistor therein, friction brake means, means under the control of the operator of the vehicle for establishing said dynamic braking circuit to cause application of the dynamic braking means and, simultaneously therewith, to initiate application of the friction brake means, a lock-out magnet valve device having an electromagnet winding effective when a voltage exceeding a certain value is impressed thereon to cause operation of the magnet valve from one position in which it permits the application of the friction brake means to a different position in which it prevents the application of the friction brake means, means for impressing the voltage-drop across said resistor in the dynamic braking circuit on the said electromagnet winding, and current-limiting means adapted to be inserted in series relation with the electromagnet winding of the lock-out magnet valve so as to reduce the voltage impressed thereon to a voltage less than that across said resistor in the dynamic braking circuit after the lock-out magnet valve is operated to its said different position, whereby to cause said lock-out magnet valve to be automatically restored to its said one position upon a decrease of the voltage-drop across the said resistor below a value substantially the same as said certain value.

18. Vehicle wheel brake apparatus comprising, in combination, normally operated means under the control of the operator for effecting application and release of the brakes associated with the vehicle wheels, a deadman device effective independently of the normally operated means for effecting application of the brakes, means operative only in response to the rotative deceleration of a wheel unit of the vehicle at a rate exceeding a certain rate occurring only when the wheel unit slips due to application of the brakes for effecting a reduction in the degree of application of the brakes, and means effective in response to the operation of the said deadman device to effect an application of the brake means for rendering said deceleration responsive means non-operative.

19. In a vehicle wheel brake apparatus of the type having brake means associated with the wheels of the vehicle and normally operated means under the control of the operator for effecting application and release of the brake means, the combination comprising a deadman device having a normal position and operative to a different position to cause an application of the brake means to be effected independently of the normally operated means, means operative in response to the slipping of a wheel unit of the vehicle due to application of the brake means for effecting a reduction in the degree of application of the brake means, and means effective in response to the operation of said deadman device to its different position for rendering the said wheel-slip responsive means instantly non-effective to vary the degree of the brake application independently of whether or not an application of the brake means results from such operation of the deadman device.

20. In a vehicle wheel brake apparatus of the type having brake means associated with the wheels of the vehicle and normally operated means under the control of the operator for effecting application and release of the brake means, the combination comprising a deadman switch device having a normal position and operative to a different position to cause an application of the brake means to be effected independently of the normally operated means, means operative in response to the slipping of a wheel unit of the vehicle due to application of the brake means for effecting a reduction in the degree of application of the brake means, and current-responsive means controlled by said deadman switch device and effective upon operation of the deadman device to its said different position for rendering said wheel-slip responsive means non-effective to vary the degree of the brake application.

21. In a vehicle wheel brake apparatus of the type having brake means associated with the wheels of the vehicle and normally operated means under the control of the operator for effecting application and release of the brake means, the combination comprising a deadman device having a normal position and operative to a different position to cause an application of the brake means to be effected independently of the normally operated means, a circuit, means for causing a current to flow in said circuit substantially proportional to the rate of change of speed of a vehicle wheel, current-responsive means operated in response to a current in said circuit exceeding a certain value for effecting a reduction in the degree of application of the brake means, and means effective upon operation of said deadman device to its said different position for interrupting said circuit whereby to render said current-responsive means non-effective to cause a variation in the degree of application of the brake means.

CLAUDE M. HINES.